June 23, 1959 W. L. BIDLINGMAYER ET AL 2,891,543
ANTISEPTIC DOUCHE APPARATUS
Filed July 21, 1952
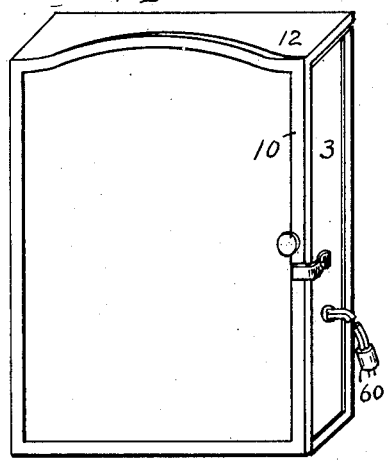
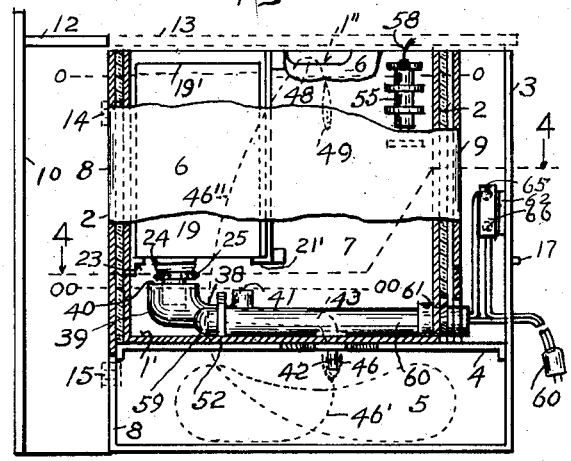
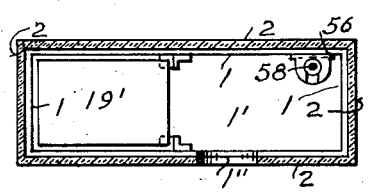
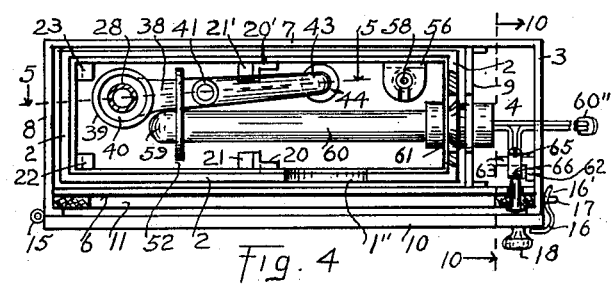
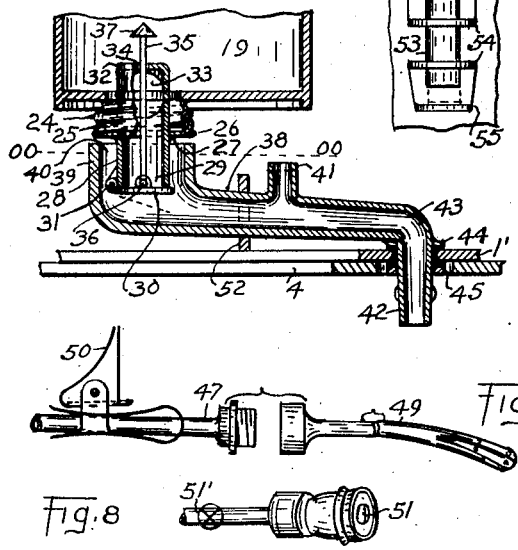
INVENTOR
William L. Bidlingmayer
and Mossie Sikes Bidlingmayer
BY
ATTORNEY

2,891,543
ANTISEPTIC DOUCHE APPARATUS

William L. Bidlingmayer and Moffie Sikes Bidlingmayer, Eustis, Fla.

Application July 21, 1952, Serial No. 300,017

8 Claims. (Cl. 128—248)

Our invention pertains to improvements in sanitary douching apparatus, and the principal objects thereof are:

(a) A douching apparatus comprising a water supply tank and a container of antiseptic material and means whereby when the water is mostly drained from said tank into and through a douche hose, the contents of said container becomes thereupon automatically released and flows into said hose for consecutive antiseptic douching purposes, and siphoning said contents.

(b) The accomplishment of the above results in which hydrostatic pressure of the water detains the antiseptic material in said container, but co-incidentally with the advent of low water and consequent low hydrostatic pressure the contents of said container is permitted to pass therefrom and into said douche hose.

(c) The use in combination therewith of an electric thermostatically controlled heating device to automatically warm the douching materials of the apparatus to desirable douching temperature, in readiness for use at all times.

(d) An antiseptic material container disposed and substantially submerged within the water of said tank and having an egress spout projecting well below the low water level of the water in said tank, and said container being readily removable therefrom, and a thermostatically controlled heater disposed in said tank and well below the low water level thereof, to assure its water coverage to guard against the overheating of said heater.

(e) An electrically heated douching unit comprising a heater, a water tank and an antiseptic material container as a douching unit contained and concealed wholly within a cabinet, in which the closing of the door thereof closes the electric circuit of said heater to continuously heat the douching contents of the unit, and the opening of said door breaks said electric circuit during use of the apparatus.

(f) To form and dispose of the elements of the apparatus in such a way that they may be readily accessible for cleaning, re-filling and re-placing, and preferably to completely enclose said apparatus in a conventional type of well designed and pleasant looking medicinal or bathroom cabinet, including the douche hose of said unit.

With these objects in view,

Fig. 1 presents a geometric view of a conventional medicinal type of cabinet with closed door.

Fig. 2 is a detached view of the open top of the water tank of the apparatus showing a thin outer coating of insulating material surrounding the walls thereof, and with an inverted antiseptic material container with downward disposed egress spout, and removably retained in its operative position in said water tank—also a type of water gauge.

Fig. 3 illustrates a vertically, somewhat elongated, open door, interior view of Fig. 1 with the front wall and insulating coating of the water tank front wall, including said wall, partly broken away, to display said tank and the antiseptic material container, a drainage pipe having open drainage ports and the connection of said pipe with a douche hose (indicated by the curved dotted lines), an electric thermostatically controlled heater and switch and house circuit connecting plug therefor.

Fig. 4 presents a somewhat enlarged top view of Fig. 3, showing the elements thereof but with the aforesaid antiseptic container removed, and is taken approximately on the line 4—4 of Fig. 3, and shows the top of the cabinet door, but without the right angularly disposed water tank cover carried thereby, as shown in Fig. 3.

Fig. 5 illustrates an enlarged, partly fragmentary detail sectional view of the lower part of the antiseptic material container, including the drainage pipe and the respective open discharge ports thereof for the water of the water tank and for the egress spout of the antiseptic container of Figs. 3 and 4, and a valve for said spout and the depending nozzle for connecting the douche hose with the drainage pipe.

Fig. 6 shows in detached view of a high water gauge disposed on a fragment of the rear wall of the water tank, shown in Figs. 2, 3 and 4.

Fig. 7 displays a conventional type of douche hose coupling and a slip pipe adapted to couple therewith, with a conventional type of hose clamp partly broken away.

Fig. 8 presents a detached view of a conventional form of douche hose faucet connection, coupled to a douche hose connection end.

Fig. 9 illustrates in diagram in reduced form a douche hose forked at its distal end to enable either or both of the connections shown in Figs. 7 and 8, to be coupled to its forked ends, with the position of clamps or valves indicated by crossed circles on each fork of the hose and at the distal end thereof, to close either part of the hose.

Fig. 10 is an enlarged, vertical detail view, with door and door jamb of the cabinet partly broken away and in section, showing side view of a thermostat electric circuit switch indicated in Figs. 3 and 4, and, Fig. 11 also presents an enlarged, detail top view of the switch and parts of Fig. 10, and fragments of the open end of the cabinet door—also its catch.

In the accompanying specification and drawings, 1 represents the thin vertical metal wall of the water tank and 1' its lower wall or bottom.

The said water tank has preferably a capacity of one (1) gallon, and the hereinafter described antiseptic material container a capacity of about one quart—one-fourth of that of the water tank.

The outer surfaces of the vertical walls of the water tank (at least those of the front and right side walls thereof) are preferably covered with a thin stiff sheet of insulating fibre or other material 2, and the tank as shown is installed or may be built in a medicinal or bathroom cabinet 3, and rests upon a shelf or sufficient supports at 4 above the bottom of the cabinet (forming thereby a storage compartment 5 in which the usual douche hose—indicated by the curved dotted lines in Fig. 3—may be conveniently coiled and completely hidden from view) within the respective front, back and left walls 6 and 7 and 8, and the vertical inner partition wall 9. The said cabinet wall 6 in front of the water tank, may, however, be dispensed with, since the air space between the front insulation 2 of the tank and the back of the cabinet door 10 as indicated at 11, can assist in insulating the front wall of said tank from radiation of heat therefrom and from the contents of the antiseptic container positioned in said tank.

The said cabinet door is preferably provided with a right angularly disposed thin flat top or plate 12 which is of sufficient width and length to overlap at least the main part of the open top of the water tank to serve as a cover therefor when the door is closed, as shown at 12 in Fig. 1 and by the dotted lines 13 in Fig. 3. Instead of being rigidly connected with the top of said door the said plate 12 may be hinged thereto (said hinge connection not shown).

The said door 10 is preferably hinged at 14, 15 to the left side of the cabinet as shown (but may be hinged at the right side thereof if desired), and is provided with conventional latch parts indicated by the leaf spring 16, 16' and the catch pin 17 to keep the door firmly closed while the apparatus is not being used for douche purposes. A knob 18 attached to the door assists in opening it.

When the water tank 1 is filled to about three-quarters (3 quarts) of its capacity and the antiseptic container 19 is filled to its capacity, the said container is then inserted bottom-up from the top, along the guides 20, 20' and is seated on the lugs 21, 21' and 22, 23 in the water tank with its open egress spout 28 pointing downwardly and terminating at 29 with its sealed bottom 19' end up and at about on a line with the high water level indicated by the line o in the water tank (see Fig. 3).

The container 19 may consist of a receptacle such as an ordinary rectangularly shaped oil can having, as shown, a conventional type screw opening comprised of the fixed male threaded opening 24 and the complementary removable female threaded cap 25 having the usual knurled rim 26, and through which cap 25 is inserted and soldered thereto at 27 a tube 28 having an egress spout 29 at which open end of the spout a thin valve flap 30 may be loosely hinged at 31, the upper part of said tube 28 projecting upwardly inside of said container as at 32 and being provided with egress openings in its wall as indicated at 33, is over-ended or otherwise formed at 34 to supply a guide hole thereat to enable a wire 35 to operate freely therethrough, the lower end of which wire is loosely hingedly connected with the valve flap at 36, and at its upper end carries a float member 37 secured to it, which valve flap device may serve the purpose of assisting in preventing significant diffusion of the antiseptic material through the egress spout 28 at 29 into the drainage port 40 of said drainage pipe 38 (and therethrough into the douche hose) when the water pressure is sufficiently low against the end of said spout so as to permit said contents to flow or siphon into said drainage pipe and hose. It is to be understood that the contents of said container 19 is restrained from passing into said drainage pipe by the hydrostatic pressure exerted thereagainst when the water is high in the water tank and that said retardation is somewhat assisted by the partial vacuum incident in the up-ended closed bottom of said container, and that the said hydrostatic pressure is low when the water level reaches approximately its low stage as indicated by the dotted line oo in Figs. 3 and 5.

It will be seen that the drainage pipe 38 is disposed along the longitudinal axis of the water tank (and preferably) within said tank and at or adjacent the bottom 1' thereof, said pipe 38 being shown in fabricated form and provided at 39 with an upwardly disposed enlarged open end port 40, and distant therefrom an open end tubular port 41 and a preferably downwardly disposed discharge nozzle 42, 43 (with integral flange 44) passing through and beyond the water tank bottom 1' in a hole formed therein, and clearing the cabinet shelf at 45 and sealed water tight in said bottom 1' by a gasket or by any other efficient means.

To the said nozzle 42 as indicated at 46 is connected a conventional douche hose, which hose is indicated by the curved dotted line at 46', 46" within the lower compartment 5 of the cabinet, the slip end of which hose may be drawn upwardly in the front space 11 existing between the front wall of the water tank and the back of door 10 of the cabinet, and curved over the depressed part 1" formed in the top of said wall at 48, whereat the slip hose end 49 (dotted line) is directed downwardly into the water of said tank as a caution against unintentional discharge of the water thereof and of the antiseptic container—and in the event that the douche hose should be withdrawn from the cabinet while its free end is sufficiently lowered outside of the cabinet when accidentally unclamped or otherwise unestopped at the slip pipe connection 47 or at the distal end 47' as indicated by the crossed circles in Figs. 7, 8 and 9, which are intended to indicate such clamps, or the equivalent thereof.

A conventional type bracket shown at 52 is secured to the bottom well 1' of the water tank, which positions and properly supports the large end 39 of the drainage pipe 38, whereat well down into the enlarged diameter opening 40 thereof projects the open end of the egress tube or spout 28, 29, the latter part being well below the water line level represented by the dotted line oo, the said spout being open unless partly closed (or intermittently closed) by the aforesaid valve flap 30.

In place of the slip pipe 49 a water faucet connection 51 may be substituted therefor at the end of the douche hose to thereby permit filling of the water tank with water from the house water system, instead of the necessity of separately drawing and pouring water into the top of said tank by hand—also, as shown, the end of the douche hose may be bifurcated as at 47' and its two ends respectively fitted with conventional connections—one of them to receive a slip pipe such as 49 and the other thereof the faucet connection 51 co-incidentally, and that a conventional type clamp such as shown at 50 in Fig. 7 may be fitted on each fork of the hose as indicated by the crossed circles shown thereon, so that either of the forked parts may be closed and the other part left open in readiness for use without removing the then un-used terminal.

It is possible, also, that a permanent connection (not shown), may be made between the water pipe house system and tank to fill the water tank therefrom.

A gauge to indicate the high water level in said tank is illustrated by an empty phial 53 slideable vertically in ordinary guide holes formed in flanges 54 of a bracket attached to the rear wall of said tank. When the water is low therein the bottom of the phial rests on a ledge 55 connected with a bracket 54, but when the water is high as indicated by the dotted line o in Fig. 3, the phial floats upwards until a part thereof bears against the underside of the flange 56. A cork 57 is sealed in the mouth of the phial and a vertically disposed flexible indicator is carried thereby and projects above the top of the wall of said tank, for which purpose a feather 58 is preferably used, although another type may be substituted therefor, since the cover 12 (see Figs. 1 and 3) of the tank will not break such indicator when moved thereover, as shown by the dotted lines 13 of Fig. 3.

Disposed along the side of the drainage pipe 38 and positioned and held by a hole (hole not shown) in the bracket 52 is a conventional type of thermostatically controlled heater 60, submerged like said drainage pipe 38 below the low water line, which heater is held in place at its other end by passing through and being sealed water tight at 61, in the right hand vertical wall 1 of the aforesaid water tank, and by passing freely through the insulation 2 thereof and the vertical partition 9 of the cabinet, from which end of said heater projects a minus and positive electric circuit extension cord having a conventional socket connection 60' intended to be plugged into an electric socket or wall outlet of a house circuit.

It is possible, of course, that the drainage pipe 38 may be located outside of and below the bottom of the water tank and adjacent to the wall thereof, and that its drainage ports 40 and 41 may project upwardly through said tank bottom wall 1' and be sealed water tight in said wall with the aforesaid ports 40, 41 terminating at the low water line, and that the thermostatic heater may be differently disposed with relation to said water tank, to heat the contents thereof and of the antiseptic container. Also that the walls of both thereof may be transparent.

Secured at 62 to the wall 3 of the cabinet is an electric switch comprised preferably of an angularly off-set insulating member 63 (Figs. 10 and 11) to the upper part of which, by screw 64, is secured one wire thereof and the bent over part 65 of a contact leaf spring 66 adapted to make contact with the end 67 of a screw 68 which secures the end of the minus wire to the part 63, the free end of which spring 66 will be forced into contact with the adjacent ends of said screw 67 by the inward thrust of a plunger 68 slideably journaled in a guide hole formed through the door jamb 69 when the cabinet door 10 is closed against and forces said plunger inwardly against the normal outward pressure of a conventional coil spring indicated at 69' in Figs. 10 and 11 (which action causes contact of the leaf spring 66 with the terminal 67) and thereby closes the electric circuit to cause the thermostat of the aforesaid electric heater 60 to raise the temperature thereof and of the discharge pipe 38 and the contents of the water tank and of the antiseptic container to a pre-set degree suitable for douche purposes, which pre-set temperature is automatically maintained by said thermostat while connected with the house circuit and until the door 10 is opened to remove the douche hose for douching purpose, which opening act removes pressure from the plunger 68, leaf spring 66 and spring 69', thereby opening the circuit for safety while using the apparatus.

After the water tank and the container are re-filled and the cabinet door closed and locked by the conventional catch indicated by the commonly perforated leaf spring (said perforation being indicated at 16') and the catch pin 17 fixed in the cabinet wall—the electric circuit is again closed and the heater automatically acts to re-heat the contents and the parts of the apparatus and to maintain proper temperature thereof in readiness for douche purposes.

It is apparent from the foregoing description that the insertion of the one-quart antiseptic container into the three-quarter full water tank will raise the water level therein to the full or high water line o and thereby increase the hydrostatic pressure thereof to its full force and retarding effect upon the contents of said antiseptic container, but that when the water is drawn off from said tank until it ceases to flow through the drainage pipe and douche hose at the indicated low water line oo, the lessened hydrostatic pressure against said contents (of the container) permits the latter to thereupon flow into the drainage pipe and douche hose, and thereby completes the cleansing and antiseptic douching operation.

The term water tank cover comprises any type of cover useable for the objects hereof.

The term water tank comprises a tank having thin parallel walls fabricated as a unit and inserted within a cabinet, also, front and side vertical walls built into and made an integral part of a side and back wall of a cabinet, to form thereby a water tank composed of said four walls and the lower shelf of said cabinet integrally secured thereto.

The term drainage pipe covers any type of drainage member suitable for the objects hereof and having a discharge outlet and a douche hose connected therewith.

The principal drawings hereof, with the accompanying detail features, set forth the embodiment of our invention.

We are aware, however, that it is possible to make changes and modifications thereof, and it is therefore our intention to cover all changes and modifications of the example of the invention herein chosen for the purpose of the disclosure, which do not constitute departures from the spirit and scope of the invention.

What we therefore claim is:

1. A douche tank for dispensing in succession an initial large amount of a first douche liquid followed by a small amount of a second douche liquid, with limited intermixing thereof comprising a tank for holding a quantity of said first liquid, a container for said second liquid, having a discharge opening in the lower portion thereof, communicating with said tank below the normal level of liquid therein, said container for second liquid being closed except for said discharge opening and so positioned within the tank that the hydrostatic pressure of the liquid in the tank prevents the discharge of second douche liquid from said container until the level of the first liquid has dropped below said container opening, said opening having its area so proportioned to the hydrostatic head of said second liquid in the container, when full, that said container will freely empty into said tank when there is no obstruction below the discharge opening and a conduit for discharging said first and second liquids from said tank.

2. A device of the character described comprising a tank adapted to hold a quantity of liquid therein, a container for antiseptic material having a discharge opening in the lower portion thereof communicating with said tank below the normal level of liquid therein, said container being closed except for said lower discharge opening and so positioned with respect to the tank that the hydrostatic pressure of the liquid in said tank prevents the discharge of antiseptic material from said container until the level of the liquid has dropped, and drainage means communicating with said discharge means and said tank for discharging antiseptic material and liquid.

3. A device of the class described comprising a tank adapted to hold a quantity of liquid therein, a container for antiseptic material having a discharge opening in the lower portion thereof communicating with said tank below the normal level of liquid therein, said container being closed except for said lower discharge opening and so positioned with respect to the tank that the hydrostatic pressure of the liquid in said tank prevents the discharge of antiseptic material from said container until the level of the liquid has dropped, a drainage conduit disposed in said tank adjacent the bottom thereof and having ports therein for receiving liquid from said tank and antiseptic material from said discharge opening for passage through said drainage conduit, said drainage conduit having a discharge end passing through a wall of said tank for the discharge of liquid and antiseptic material.

4. The structure set forth in claim 1 including a drainage conduit having a discharge end and a plurality of ports therein, at least one of said ports opening into said receptacle for the passage of liquid therefrom into and through the conduit, and another of said ports being disposed to receive antiseptic material from the discharge of said container for passage into and through said conduit.

5. The structure set forth in claim 1 including a drainage conduit disposed in said receptacle adjacent the bottom thereof, said drainage conduit having a plurality of ports therein communicating with said receptacle and a discharge end extending through the bottom thereof, said container discharge having a portion thereof projecting into one of said ports in non-sealing relation therewith for the discharge of antiseptic material into said conduit.

6. The structure set forth in claim 1 including valve means operative to maintain the discharge from said container closed until the liquid level in said receptacle has dropped a pre-determined amount to prevent significant diffusion of antiseptic material into said receptacle.

7. The structure set forth in claim 6 including means associated with said valve means for urging same to closed position.

8. The structure set forth in claim 6 including a float positioned in the container and connected to said valve means whereby antiseptic solution in said container causes the float to urge said valve means to closed position.

(References on following page)

References Cited in the file of this patent

UNITED STATES PATENTS

| | | |
|---|---|---|
| 476,402 | Meyer | June 7, 1892 |
| 605,178 | Ferguson | June 7, 1898 |
| 920,225 | Van Denburgh et al. | May 4, 1909 |
| 1,609,125 | Pitt | Nov. 30, 1926 |
| 1,811,345 | Bell | June 23, 1931 |
| 2,620,097 | Titmas | Dec. 2, 1952 |
| 2,688,754 | Willits et al. | Sept. 14, 1954 |